July 16, 1940.   H. J. MURPHY   2,208,548
FASTENER AND FASTENER INSTALLATION
Filed Oct. 18, 1938

Inventor:
Howard J. Murphy.
by Walter S. Jones Att'y.

Patented July 16, 1940

2,208,548

UNITED STATES PATENT OFFICE 2,208,548

FASTENER AND FASTENER INSTALLATION

Howard J. Murphy, Greenwood, Mass., assignor to United-Carr Fastener Corporation, Cambridge, Mass., a corporation of Massachusetts Application October 18, 1938, Serial No. 235,579

8 Claims. (Cl. 287—53)

This invention relates to improvements in knob and the like fastener installations and fastener members for the same.

An object of my invention is the provision of a new and improved fastener member for detachably securing an operating member, such as a handle, knob or the like, to a shaft. It should be understood, however, that my fastener member may be used for securing other articles, than those specifically mentioned above, to a shaft or rod.

Referring to the drawing, in which I have illustrated a preferred form of my invention:

Figure 1:
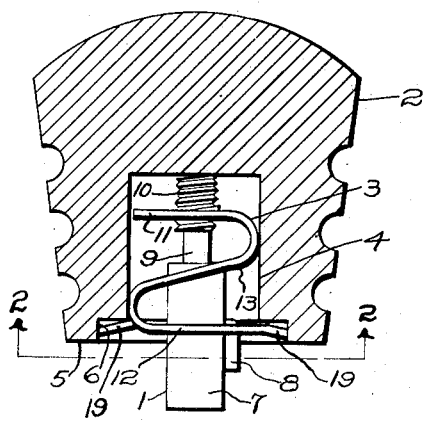
Fig. 1 is a sectional view through a knob member with a shaft and one of my improved fastener members shown in full.

Referring to my preferred installation illustrated in the drawing, I have shown a shaft 1 and an operating member, such as a knob 2, secured to the shaft 1 through means of my improved fastener member 3. The fastener member 3, which is preferably of one-piece construction, is simple and inexpensive to manufacture and is adapted for quick and easy assembly with an operating member, which may be an article of manufacture such as a rotatable knob, so as to enable a shaft to be detachably secured in non-rotative relation to the knob.

Figure 2:
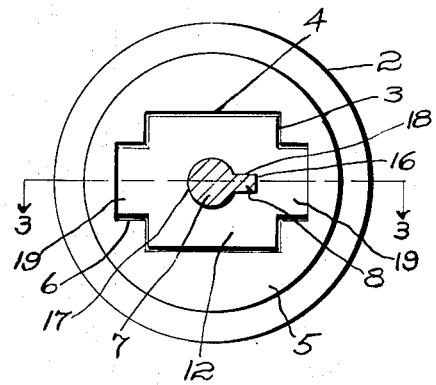
Fig. 2 is a sectional view taken along the line 2—2 of Fig. 1.

Referring in detail to the parts of my installation, the knob 2, which I have chosen for purposes of illustration, is preferably formed of a plastic material and has a rectangular opening 4 extending into the knob from a face 5 thereof. Depressions 6, which are shallower than the opening 4, extend into the knob from the face 5 in adjacent relation to the opening 4 at opposed sides thereof, as shown in Figs. 1 and 2. The depressions 6 receive attaching portions preferably formed integrally with the fastener member 3 so as to secure the fastener member in non-rotative relation to the knob, as will be hereinafter more fully described.

The shaft 1, in my preferred form, comprises a main body portion 7 which, in my preferred form, has an integral laterally-projecting portion 8 in the form of a key whereby the transverse cross-sectional shape of the shaft taken through the key is non-circular, as shown in Fig. 2. The key has an upwardly-facing shoulder 8a, which is preferably formed in a way to slope gradually on its sides to its uppermost point, thus effecting a relatively rounded shoulder for a purpose to be described. At an end of the main body portion 7, in my preferred form, I have provided a shaft extension 9 of reduced diameter. The extension 9 is threaded as at 10 from its outermost end for a specified distance toward the main body portion 7.

Figure 9:
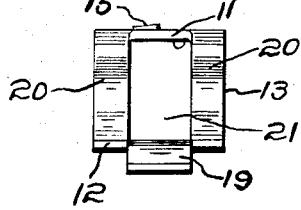
Fig. 9 is a rear view of my fastener member per se.
Figure 8:
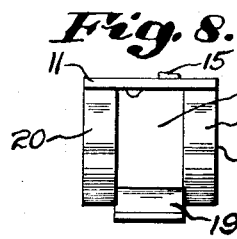
Fig. 8 is a front view of my fastener member per se.

Referring in detail to the fastener member 3, I have shown one which is preferably of one-piece construction comprising a substantially flat head 11, and a relatively flat base 12 disposed in substantially parallel relation to the head 11 and connected thereto by a yieldable reverse-bend means 13. The head 11 has an opening 14 with its edge 15, in my preferred form, displaced transversely of the plane of the head so as to form an internal screw thread of predetermined diameter and pitch for receiving the external screw threads 10 of the shaft. The base 12, which is preferably formed substantially flat, has an opening 16 therein conforming in size and shape to the cross-sectional size and shape of the shaft 7 upon a line transverse to the axis of the shaft drawn through the key 8. Thus, in my preferred form, the opening 16, as most clearly shown in Fig. 2, comprises a circular portion 17 for receiving the main body portion 7 of the shaft and a slot 18 adjacent the circular portion 17 forming a keyway for receiving the key 8 of the shaft when the fastener member is in secured engagement with the shaft. Attaching means in the form of ears 19 extend laterally of opposed ends of the base 12 and are bent transversely of the plane of the base for biting engagement with the walls of the knob 2 adjacent the depressions 6 when the fastener is in fixed attachment to the knob. The yieldable means 13 comprises a pair of reverse-bend portions 20 joined to diametrically-opposed ends of the head and base. The reverse-bend portions 20 are spaced one from another providing an opening 21 between them (Figs. 8 and 9) enabling the shaft 7 to be projected axially of the fastener to engage the threaded portion 10 with the thread-engaging means 15 of the head 11.

Figure 3:
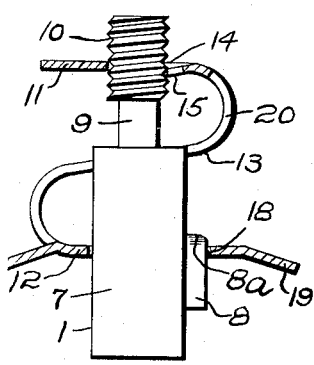
Fig. 3 is a view taken along the line 3—3 of Fig. 2 showing my improved fastener member in full secured position, but omitting the knob member.
Figure 4:
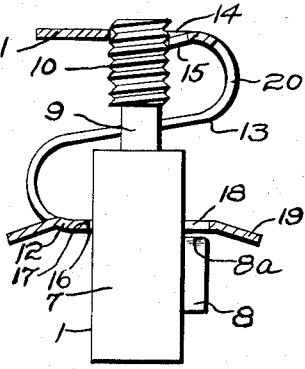
Fig. 4 is a section similar to Fig. 3 showing one position of the fastener member relative to the shaft during a rotational operation by which the fastener member is secured to the shaft.
Figure 5:
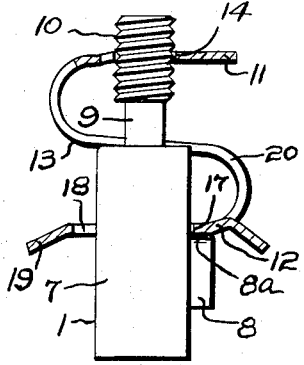
Fig. 5 is a view similar to that of Fig. 4 showing a later position of the parts in the fastening operation.
Figures 6, 7:
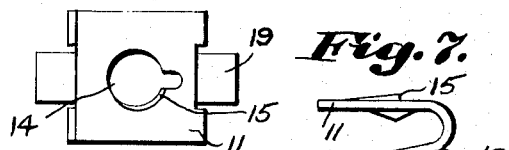
Fig. 6 is a top plan view of my improved fastener member per se.
Fig. 7 is a side view of my fastener member per se.

In assembling parts of my installation, the fastener member is first secured with the knob by moving the head of the fastener member into the opening 4 of the knob until the ears 19 of the base 12 are disposed adjacent the entrance to the depressions 6. Next, pressure is exerted on the base 12 by a suitable tool (not shown) in the direction of the innermost portions of the knob. As a result of this action, the ears 19, which normally have a greater spread than the distance between furthest lateral edges of the depressions 6—6, are contracted toward one another so as to be moved more deeply into the depressions. When the inward pressure is released, the ears tend to expand toward their normal position with the result that outermost edges of the same bite into material of the knob adjacent the depressions so as to secure firmly the fastener member to the knob. In assembling the knob 2 with the shaft, the reduced extension 9 is extended through the opening 16 of the base and moved axially of the fastener to engage the threaded portion 10 with the thread-engaging means 15 of the head of the fastener. Next, as most clearly shown in Figs. 4 and 5, the knob is turned so as to move the head 11 of the fastener member along the threaded portion 10 of the shaft in the direction of the main body 7 of the shaft. After a predetermined number of turns of the head 11, the base 12 of the fastener abuts the shoulder 8a of the key 8 with the keyway slot 18 of the opening 16 of the base so positioned relative to the key that the head of the fastener member must be turned further a distance such as one-half convolution of a screw thread, as illustrated in Fig. 5 of the drawing, to bring the keyway 18 into alignment with the key 8. The aforesaid further turning of the fastener head causes the base 12 to slidingly rotate over the rounded shoulder 8a and at the same time the base is compressed against the tension set up in the reverse-bend portions 20. Thus, when the one-half convolution turn has been completed and the keyway 18 is in alignment with the key 8, the base expands toward normal position so as to receive the key 8 through the keyway 18, as most clearly shown in Figs. 1 and 3, thereby non-rotatively engaging the fastener member with the shaft. Removal of the knob from the shaft is a relatively simple matter and may be performed by pulling the knob axially outwardly relative to the shaft so as to disengage the base from the key 8 and holding the knob in this pulled position until it has been rotated sufficiently in a reverse direction to move the keyway out of alignment with the key. After this action, pull pressure upon the knob may be released and the knob separated from the shaft by continued reverse rotation.

Thus by my invention I have provided an installation which includes a fastener member of simple and inexpensive construction formed in a way to carry out efficiently the desired objects.

Although I have illustrated and described a preferred embodiment of my invention, I do not wish to be limited thereby because the scope of my invention is best defined in the following claims.

I claim:

1. An installation of the class described comprising a shaft, a knob on one end of said shaft, a fastening member securing said knob to said shaft, said fastening member having a shaft-gripping portion rotatively engaging said shaft and held against accidental axial movement relative to said shaft, a substantially flat base portion spaced from said shaft-gripping portion and having a non-circular aperture, said shaft having a short portion the same general shape as said aperture to hold the fastener member against rotation relative to the shaft except when the base is moved out of engagement with that portion, a yieldable portion connecting the shaft-gripping portion to said base and permitting movement of one portion toward and away from the other, and attaching means securing the fastener rigidly to said knob.

2. An installation of the class described comprising a shaft, a hollow operating member such as a knob or the like and a one-piece fastener member assembled with said operating member detachably securing said operating member to said shaft, said shaft having a threaded portion adjacent its outermost end, said fastener member comprising a head having thread-engaging means, a base having an opening, and a yieldable portion connecting said head and said base, said shaft being extended through said opening of said base into threaded engagement with said thread-engaging means of said head, and said base and said shaft having means entering into co-engaging fastener relation after rotation of said operating member to turn said head a predetermined distance along said threaded portion of said shaft whereby said operating member is secured to said shaft.

3. An installation of the class described comprising a shaft, an operating member such as a knob or the like secured to said shaft and a one-piece fastener member assembled with said operating member for detachably securing said operating member to said shaft, said shaft having a threaded portion adjacent its outermost end and a portion of non-circular cross-sectional shape in predetermined spaced relation to said threaded portion, said fastener member comprising a head having thread-engaging means, a base portion having an opening conforming in size and shape to the cross-sectional area of said non-circular portion of said shaft and a yieldable portion connecting said head portion and said base portion, said shaft being extended through said opening of said base into threaded engagement with said thread-engaging means of said head, said base portion receiving said non-circular portion of said shaft through said non-circular opening after rotation of said operating member to turn said head portion a predetermined distance along said threaded portion of said shaft whereby said operating member is secured to said shaft.

4. An installation of the class described comprising a shaft, a hollow operating member such as a knob or the like and a one-piece fastener member assembled with said operating member for detachably securing said operating member to said shaft, said shaft having a threaded portion adjacent its outermost end, said fastener member disposed within said hollow of said operating member and having integral means engaging said operating member maintaining said fastener member in firm non-rotatable assembly therewith, said fastener member comprising a head having thread-engaging means, a base having an opening, and a yieldable portion connecting said head and said base, said shaft being extended through said opening of said base into threaded engagement with said thread-engaging means of said head, and said base and said shaft having means entering into co-engaging fastener relation after rotation of said operating member to turn said head a predetermined distance along said threaded portion of said shaft whereby said operating member is secured to said shaft.

5. An installation of the class described comprising a shaft, a hollow operating member such as a knob or the like and a one-piece fastener member assembled with said operating member detachably securing said operating member to said shaft, said shaft having a threaded portion adjacent its outermost end, said fastener member comprising a head having thread-engaging means, a base having an opening and a yieldable portion connecting said head and said base, said base having integral means engaging material of said operating member maintaining said fastener member in fixed assembly therewith, said shaft being extended through said opening of said base into threaded engagement with said thread-engaging means of said head, and said base and said shaft having means entering into co-engaging fastener relation after rotation of said operating member to turn said head a predetermined distance along said threaded portion of said shaft whereby said operating member is secured to said shaft.

6. A fastener member of one-piece construction for securing a knob or the like operating member to a shaft, said fastener member comprising a head having shaft-engaging means for rotative fastener engagement with a shaft, a substantially flat base having a non-circular opening for receiving a similarly shaped portion of said shaft and a yieldable portion joining said head to said base.

7. A fastener member of one-piece construction for securing a knob or the like operating member to a shaft comprising a head having thread-engaging means for engagement with a threaded portion of said shaft, a base having a non-circular opening for receiving a portion of said shaft and a reverse-bend portion joining said head to said base.

8. A fastener member for securing a knob or the like operating member to a shaft comprising a head having thread-engaging means for engagement with a threaded portion of said shaft, a base having a non-circular opening for receiving a portion of said shaft, and a reverse-bend portion joining said head to said base, said base having ears integral therewith adapted to engage said operating member whereby said fastener member is secured thereto.

HOWARD J. MURPHY.